United States Patent
Beauvais

(10) Patent No.: US 9,915,090 B2
(45) Date of Patent: Mar. 13, 2018

(54) SYSTEMS AND METHODS FOR VEHICLE INTERIOR PROTECTION FROM PRECIPITATION

(71) Applicant: Ford Global Technologies, LLC, Dearborn, MI (US)

(72) Inventor: Brandon Beauvais, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/007,955

(22) Filed: Jan. 27, 2016

(65) Prior Publication Data

US 2017/0211309 A1    Jul. 27, 2017

(51) Int. Cl.
*G01S 19/00* (2010.01)
*E05F 15/71* (2015.01)
*G01S 19/42* (2010.01)

(52) U.S. Cl.
CPC .............. *E05F 15/71* (2015.01); *G01S 19/42* (2013.01); *E05Y 2400/44* (2013.01); *E05Y 2400/45* (2013.01); *E05Y 2800/428* (2013.01); *E05Y 2900/55* (2013.01)

(58) Field of Classification Search
CPC .. E05F 15/71; E05Y 2900/55; E05Y 2400/45; E05Y 2800/428; E05Y 2400/44; B60Q 5/00; G08G 1/0967; G01W 1/10; G01S 19/42

See application file for complete search history.

(56) References Cited

U.S. PATENT DOCUMENTS

| | | | |
|---|---|---|---|
| 5,293,105 A | 3/1994 | West, Jr. | |
| 6,329,923 B2 * | 12/2001 | Hog | B60S 1/0818 15/250.001 |
| 6,906,632 B2 * | 6/2005 | DeLine | B60R 1/12 340/425.5 |
| 8,625,815 B2 * | 1/2014 | DeLine | B60R 1/12 296/1.11 |
| 9,002,584 B2 * | 4/2015 | Van Wiemeersch | E05F 15/71 345/633 |
| 9,488,980 B2 * | 11/2016 | Haberl | G06F 1/163 |

(Continued)

FOREIGN PATENT DOCUMENTS

| | | |
|---|---|---|
| DE | 102010035546 A1 | 4/2011 |
| DE | 102012024562 A1 | 8/2013 |

(Continued)

OTHER PUBLICATIONS

Search Report dated Jul. 11, 2017 for Great Britain Patent Application No. GB1701302.0 (4 Pages).

*Primary Examiner* — Jason Holloway
(74) *Attorney, Agent, or Firm* — James P. Muraff; Neal, Gerber & Eisenberg LLP

(57) ABSTRACT

Systems and methods are provided for preventing damage to a vehicle interior due to precipitation. The systems can include a location module, window control module, and rain sensor all communicatively linked to a processor. In the event a vehicle's windows are determined to be down, the processor can determine the likelihood of precipitation in the area of the vehicle's location. If precipitation is likely, the processor causes the rain sensor to be powered. If the rain sensor indicates the presence of precipitation, the processor directs the window control module to close the vehicle's windows.

15 Claims, 3 Drawing Sheets

(56) References Cited

U.S. PATENT DOCUMENTS

| | | | | |
|---|---|---|---|---|
| 2001/0038335 A1* | 11/2001 | Hog | B60S 1/0818 | 340/601 |
| 2003/0192566 A1* | 10/2003 | Neubauer | B60S 1/0822 | 134/1 |
| 2007/0188122 A1* | 8/2007 | Andrejciw | E05F 15/75 | 318/483 |
| 2007/0210737 A1* | 9/2007 | Brander | E05F 15/71 | 318/483 |
| 2008/0094685 A1* | 4/2008 | Varaprasad | B32B 17/06 | 359/267 |
| 2011/0090338 A1* | 4/2011 | DeLine | B60R 1/12 | 348/148 |
| 2011/0118897 A1 | 5/2011 | Menard et al. | | |
| 2013/0060430 A1* | 3/2013 | Kanning | G08G 1/096716 | 701/49 |
| 2014/0288784 A1* | 9/2014 | Van Wiemeersch | E05F 15/71 | 701/46 |
| 2014/0307247 A1* | 10/2014 | Zhu | G01S 17/023 | 356/4.01 |
| 2016/0147222 A1* | 5/2016 | Haberl | G06F 1/163 | 701/2 |
| 2016/0203403 A1* | 7/2016 | Nagel | H04L 51/32 | 706/61 |
| 2017/0016266 A1 | 1/2017 | Van Wiemeersch et al. | | |

FOREIGN PATENT DOCUMENTS

| | | | |
|---|---|---|---|
| JP | 2007237789 A | 9/2007 | |
| JP | 2010047958 A | 3/2010 | |
| KR | 20050090600 A | 9/2005 | |

\* cited by examiner

SYSTEMS AND METHODS FOR VEHICLE INTERIOR PROTECTION FROM PRECIPITATION

TECHNICAL FIELD

The following disclosure relates to systems and methods for preventing the interior of a vehicle from being damaged by precipitation due to the vehicle's windows being left open.

BACKGROUND OF THE INVENTION

Many vehicle owners and operators often park and leave their vehicles with the windows down either because the weather appears clear or because they forget to close them. Moreover, in many climates the chances for precipitation are inherently unpredictable and can change rapidly. This leads to the common occurrence of the interiors of vehicles being damaged by rain or snow where the windows were left down but the operators was either unable to get back to the vehicle in time to close the windows or was simply unaware of the precipitation. Accordingly, there is a need for a system to automatically sense the presence of precipitation and, if a vehicle's windows are down, to close them.

SUMMARY OF THE INVENTION

Systems and methods are provided for preventing damage to a vehicle interior due to precipitation. The systems can include a location module, window control module, and rain sensor all communicatively linked to a processor. In the event a vehicle's windows are determined to be down, the processor can determine the likelihood of precipitation in the area of the vehicle's location. If precipitation is likely, the processor causes the rain sensor to be powered. If the rain sensor indicates the presence of precipitation, the processor directs the window control module to close the vehicle's windows.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION OF EXEMPLARY EMBODIMENTS OF THE INVENTION

Figure 1:
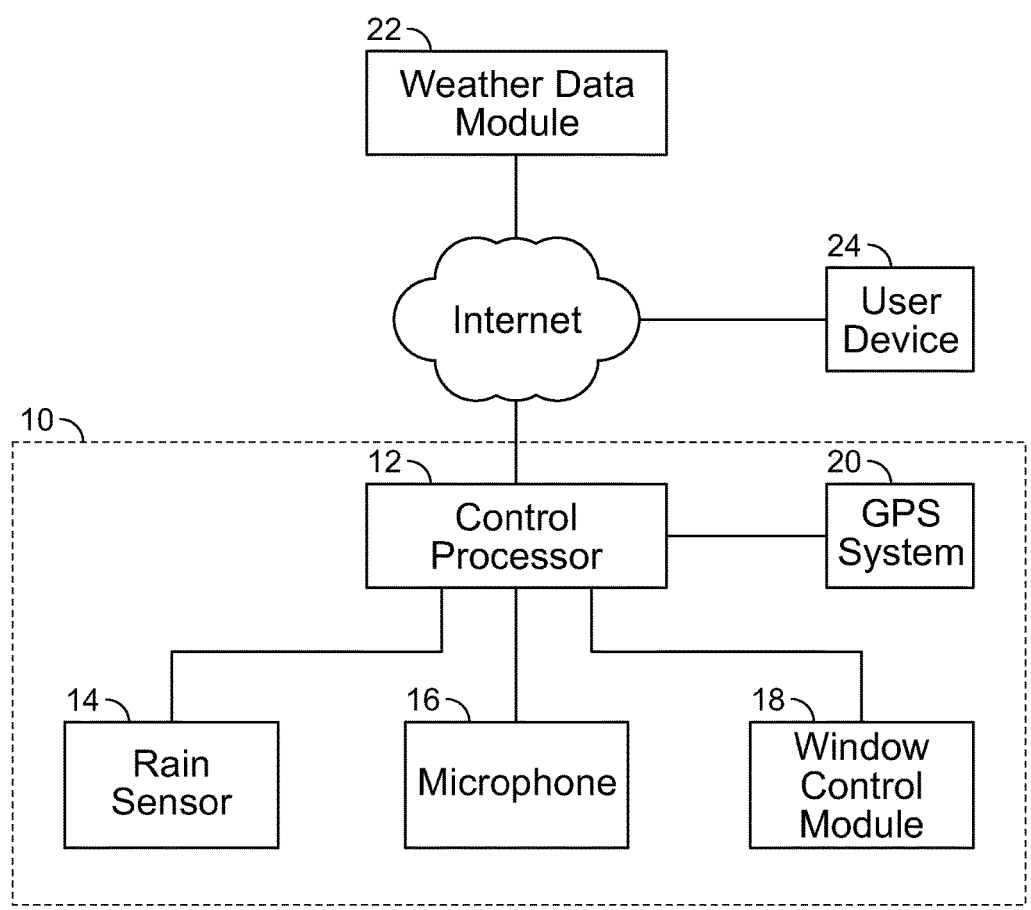
FIG. 1 is a flow chart diagram illustrating the various components of an exemplary embodiment of a system in accordance with the invention.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 illustrates components of an exemplary embodiment system in accordance with the invention. A vehicle equipped with the system has the following vehicle electronics 10 components integrated into the vehicle itself: a control processor 12, a rain sensor 14, a microphone 16, a window control module 18, and a GPS system 20. The rain sensor 14 may be any type of rain sensor currently in commercial use in vehicles or any other type of sensor capable of detecting the presence of precipitation. The window control module 18 is capable of sensing the positional status of each of the vehicle's windows, communicating that status to other vehicle components, and opening or closing each window of the vehicle. One of ordinary skill in the art will understand that window control module 18 may also have similar functionality over other vehicle components that open and close including without limitation sunroofs, moonroofs, and convertible tops without departing from the novel scope of the present invention. The GPS system 20 can be any GPS system commonly integrated into many vehicles or any other type of system that determines the geographic location of the vehicle.

Each of the rain sensor 14, microphone 16, window control module 18, and GPS system 20 is communicatively connected to the control processor 12. The control processor 12 can also access a variety of information over the Internet including a weather data module 22 and a user device 24. The weather data module 22 can be any website or other data repository that can provide weather forecast data at a particular geographical location for a specified time period. The user device 24 can be a computer, smartphone, tablet, or similar device that a user might use to access one or more applications running at the vehicle control processor 12. The control processor 12 is configured to execute one or more methods of preventing the interior of the vehicle from being damaged from precipitation where the vehicle was left by the user with the windows open as depicted in FIGS. 2 and 3.

Figure 2:
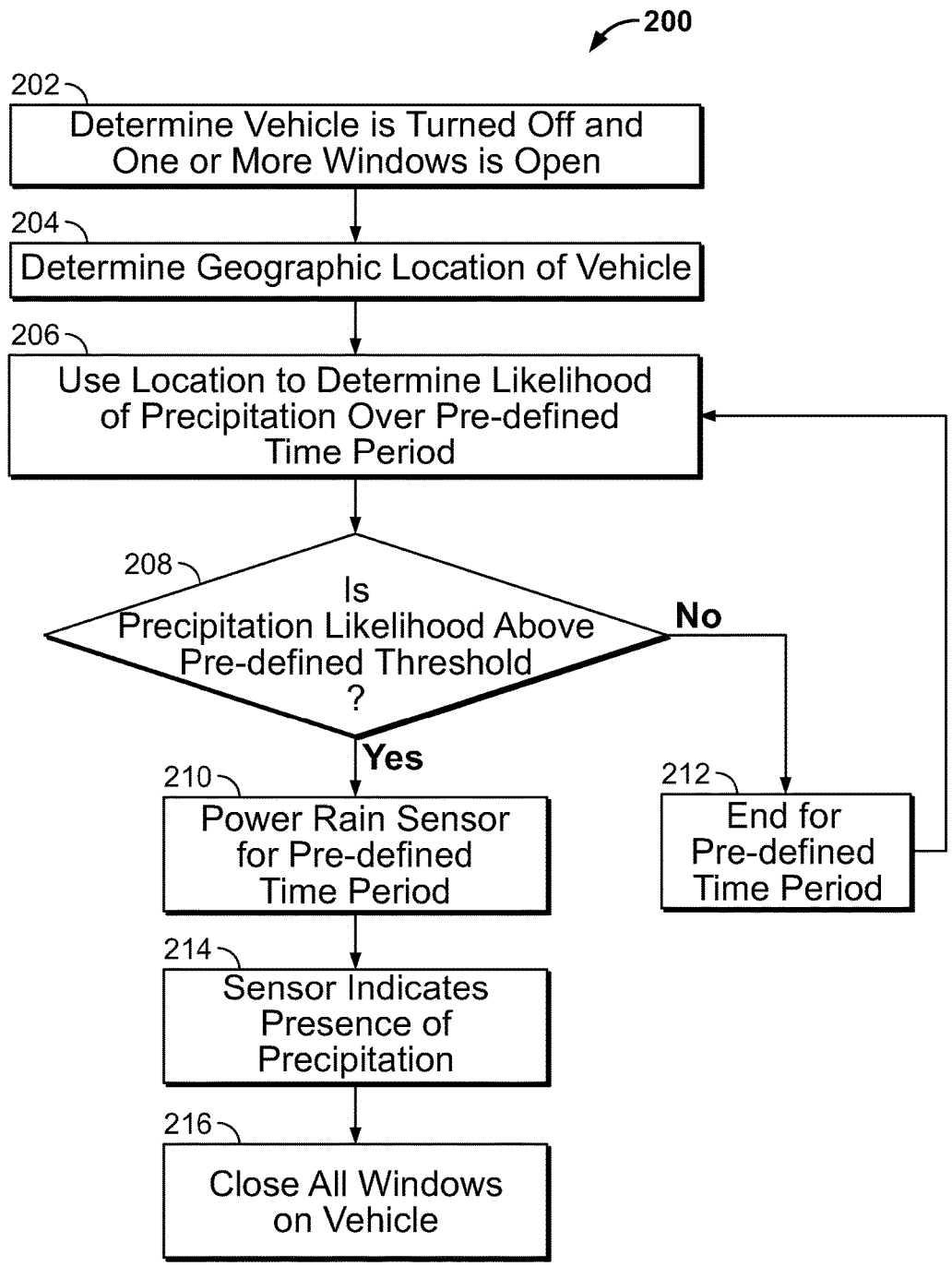
FIG. 2 is a flow chart diagram illustrating the various steps of an exemplary embodiment of a method in accordance with the invention.

FIG. 2 shows a method 200 of using an embodiment of the present invention. At step 202, the control processor 12 and window control module 18 verify that the vehicle has been turned off and that at least one window on the vehicle is not completely closed. At step 204, the GPS system 20 determines the geographic location of the vehicle and transmits that information to the control processor 12. Then, at step 206, the control processor 12 uses the location of the vehicle to access the weather data module 22 and determine the likelihood of precipitation within a pre-determined radius of the vehicle's location over a pre-determined time period. Those of ordinary skill in the art will understand that the radius and time period may be varied according to the specific characteristics of the regional climate the vehicle is located in. At step 208, the control processor determines whether the likelihood of precipitation at or near the vehicle over the pre-determined time period exceeds a pre-determined threshold. For example, a threshold of 50% may be commonly used but again could be varied according to the vehicle's regional climate or risk tolerance of the user. If the precipitation threshold is not met, the system proceeds to step 212 and idles for the remainder of the pre-determined time period before returning to step 206. If the precipitation threshold is met, the system proceeds to step 210 where the rain sensor 14 is then powered for the pre-determined time period. At step 214, if the rain sensor 14 detects the presence of precipitation it notifies the control processor 12. Then, at step 216, the control processor 12 instructs the window control module 18 to close all windows on the vehicle. Those of ordinary skill in the art will understand that embodiments of the present invention may also include systems and methods where the control processor 12 instructs the window control module 18 to close all windows immediately upon a determination that the precipitation threshold is met without the need for a rain sensor or microphone.

Figure 3:
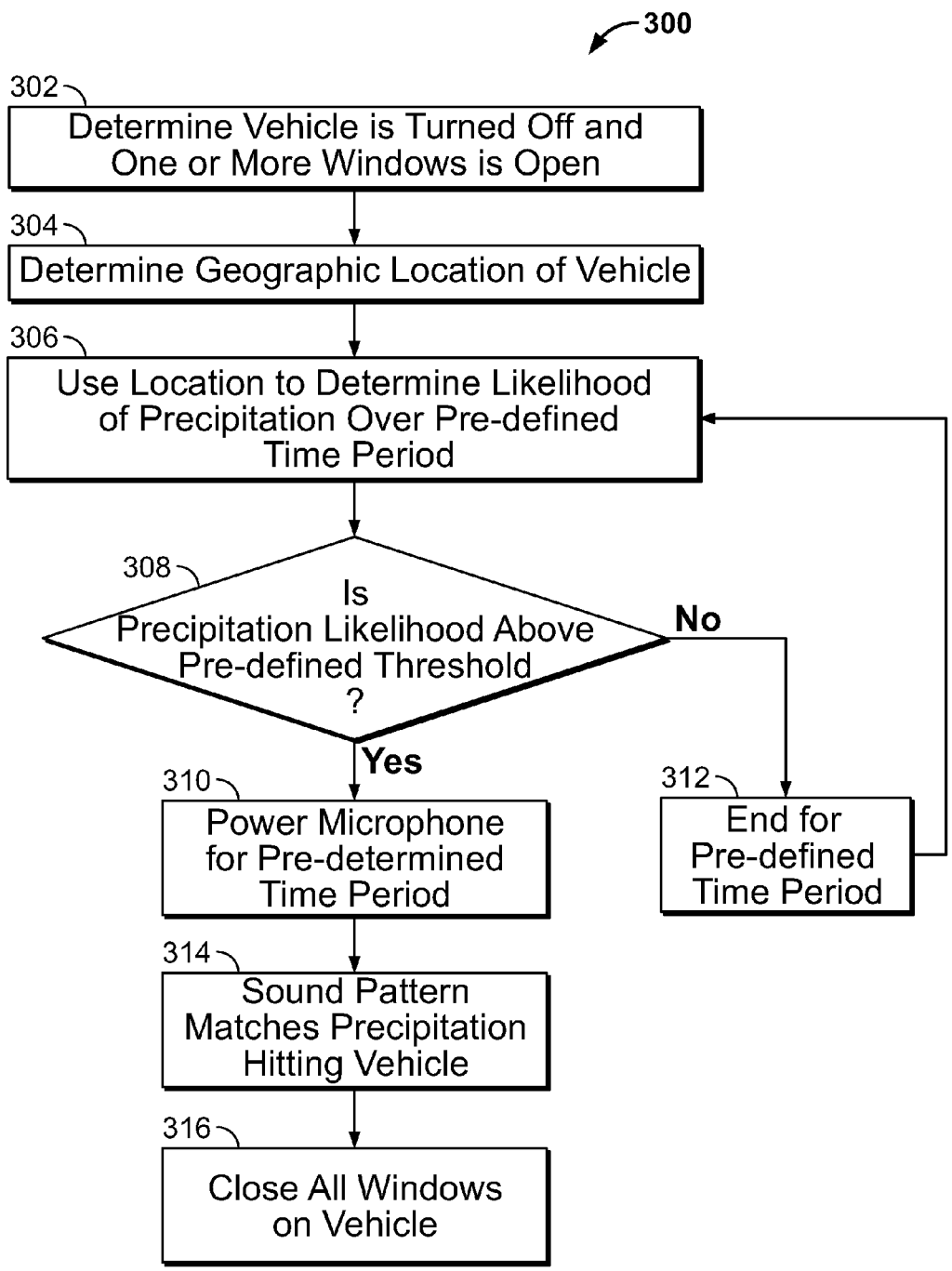
FIG. 3 is a flow chart diagram illustrating the various steps of an alternative exemplary embodiment of a method in accordance with the invention.

FIG. 3 shows a method 300 of using an alternative embodiment of the present invention. At step 302, the control processor 12 and window control module 18 verify that the vehicle has been turned off and that at least one window on the vehicle is not completely closed. At step 304, the GPS system 20 determines the geographic location of the vehicle and transmits that information to the control processor 12. Then, at step 306, the control processor 12 uses the location of the vehicle to access the weather data module 22 and determine the likelihood of precipitation within a pre-determined radius of the vehicle's location over a pre-determined time period. Those of ordinary skill in the art will understand that the radius and time period may be varied according to the specific characteristics of the regional climate the vehicle is located in. At step 308, the control processor determines whether the likelihood of precipitation at or near the vehicle over the pre-determined time period exceeds a pre-determined threshold. For example, a threshold of 50% may be commonly used but again could be varied according to the vehicle's regional climate or risk tolerance of the user. If the precipitation threshold is not met, the system proceeds to step 312 and idles for the remainder of the pre-determined time period before returning to step 306. If the precipitation threshold is met, the system proceeds to step 310 where the microphone 16 is then powered for the pre-determined time period. The microphone 16 converts all audible sounds at or near the vehicle and sends a corresponding digital signal to control processor 12. In this embodiment, control processor 12 has been configured to recognize digital sound signals that correspond to the sound of various forms of precipitation hitting a vehicle. Thus, at step 314, if the microphone 16 sends a signal that is recognized by control processor 12 as precipitation hitting the vehicle. Then, at step 316, the control processor 12 instructs the window control module 18 to close all windows on the vehicle. Although the exemplary methods shown in FIGS. 2 and 3 utilize the rain sensor 14 and microphone 16 as alternative means of precipitation detection, those of ordinary skill in the art will understand that these components could also be used in tandem either in parallel or in series with one another without departing from the novel scope of the present invention.

It should be understood that the invention is not be limited to any single embodiment and should only be construed in breadth and scope in accordance with recitation of the appended claims.

I claim:

1. A method of protecting the interior of a vehicle comprising the steps of:
   receiving and transmitting vehicle location data to a weather prediction module;
   receiving a precipitation likelihood within a predetermined radius of a vehicle location from the weather prediction module;
   powering on a precipitation sensor on the vehicle in response to determining that the precipitation likelihood is greater than a predetermined threshold, the predetermined threshold being adjustable based on a risk tolerance of a user;
   receiving a precipitation signal from the precipitation sensor;
   determining whether there is precipitation at the vehicle location based on the precipitation signal; and
   transmitting a close signal to a window control module to close a window of the vehicle in response to determining that there is precipitation at the vehicle location.

2. The method of claim 1 wherein the likelihood of precipitation received is for a predetermined time period.

3. The method of claim 2 wherein the precipitation sensor is powered for the predetermined time period.

4. The method of claim 1 further comprising the step of prior to transmitting the vehicle location data, receiving a signal from the window control module that at least one vehicle window is not completely closed.

5. The method of claim 1 further comprising the step of prior to powering the precipitation sensor, powering a microphone located on the vehicle.

6. The method of claim 5 further comprising the step of receiving from the microphone a signal that matches a sound profile for precipitation hitting the vehicle.

7. The method of claim 1 wherein the weather prediction module is located at a third-party website.

8. A method of protecting the interior of a vehicle comprising the steps of:
   receiving and transmitting vehicle location data to a weather prediction module;
   receiving a precipitation likelihood within a predetermined radius of a vehicle location from the weather prediction module;
   powering on a microphone located on the vehicle in response to determining that the precipitation likelihood is greater than a predetermined threshold, the predetermined threshold being adjustable based on a risk tolerance of a user;
   receiving a signal from the microphone that matches a sound profile for precipitation hitting the vehicle;
   determining whether there is precipitation at the vehicle location based on the precipitation signal; and
   transmitting a close signal to a window control module to close a window of the vehicle in response to determining that there is precipitation at the vehicle location.

9. The method of claim 8 wherein the likelihood of precipitation received is for a predetermined time period.

10. The method of claim 9 wherein the microphone is powered for the predetermined time period.

11. The method of claim 8 further comprising the step of prior to transmitting the vehicle location data, receiving a signal from the window control module that at least one vehicle window is not completely closed.

12. The method of claim 8 further comprising the step of prior to powering the microphone, powering a precipitation sensor located on the vehicle.

13. The method of claim 12 further comprising the step of receiving a signal from the precipitation sensor that precipitation is occurring at the vehicle location.

14. The method of claim 6 wherein determining whether there is precipitation at the vehicle location is based on whether the signal received from the microphone matches the sound profile.

15. The method of claim 13 wherein determining whether there is precipitation at the vehicle location is based on the signal received from the precipitation sensor.

\* \* \* \* \*